United States Patent [19]
Trainer

[11] Patent Number: 5,810,105
[45] Date of Patent: Sep. 22, 1998

[54] ULTRASONIC TRACKING CONTROL FOR AN AUTOMOTIVE VEHICLE

[75] Inventor: Wolfram Trainer, Düsseldorf, Germany

[73] Assignee: Technologietransfer-Anstalt Tetra, Mauren, Germany

[21] Appl. No.: 614,654

[22] Filed: Mar. 13, 1996

[30] Foreign Application Priority Data

Mar. 15, 1995 [DE] Germany ................ 195 09 320.8

[51] Int. Cl.⁶ .................................................. B60T 7/16
[52] U.S. Cl. ........................... 180/169; 280/DIG. 5; 340/902
[58] Field of Search ................... 180/169, 167; 280/DIG. 5; 340/903, 904, 902, 572; 367/909, 6, 117, 129

[56] References Cited

U.S. PATENT DOCUMENTS

| | | |
|---|---|---|
| 3,720,281 | 3/1973 | Frownfelter . |
| 3,742,507 | 6/1973 | Pirre . |
| 3,777,305 | 12/1973 | Stoutmeyer ................ 367/129 X |
| 3,976,151 | 8/1976 | Farque ........................ 180/169 |
| 4,109,186 | 8/1978 | Farque ........................ 318/587 |
| 4,136,394 | 1/1979 | Jones et al. . |
| 4,623,032 | 11/1986 | Kemmer ...................... 180/169 |
| 4,844,493 | 7/1989 | Kramer ....................... 180/169 |
| 5,050,134 | 9/1991 | Butler ......................... 367/129 X |
| 5,163,002 | 11/1992 | Kurami . |
| 5,420,794 | 5/1995 | James ......................... 340/991 X |
| 5,504,477 | 4/1996 | Whitright et al. .............. 367/6 X |
| 5,517,098 | 5/1996 | Dong ........................... 280/DIG. 5 X |
| 5,684,474 | 11/1997 | Gilon et al. .................. 340/903 |
| 5,689,250 | 11/1997 | Kremser ...................... 340/904 X |

FOREIGN PATENT DOCUMENTS

| | | | |
|---|---|---|---|
| 2002616 | 1/1970 | Germany . | |
| 3015955 | 11/1981 | Germany . | |
| 4326016 | 8/1993 | Germany . | |
| 3-262736 | 11/1991 | Japan . | |
| 1403238 | 7/1972 | United Kingdom . | |
| 2 038 132 | 7/1980 | United Kingdom ........ 367/909 |

*Primary Examiner*—Robert J. Oberleitner
*Assistant Examiner*—Tyrone M. Lee
*Attorney, Agent, or Firm*—Diller, Ramik & Wight, PC

[57] ABSTRACT

The ultrasonic tracking control effects that a pacemaker going ahead is automatically tracked by an automotive vehicle at a predetermined distance. To this end, a control unit (13) of the vehicle (10) is equipped with two ultrasonic units (F1,F2) comprising a transceiver device for ultrasonic signals each. The pacemaker going ahead carries a second control unit (14) with a transponder (S) responding to the signals of the ultrasonic units (F1,F2). Upon reception of an ultrasonic signal, the transponder (S) outputs a response signal which is received by the respective ultrasonic unit. The distance of the vehicle from the pacemaker and the tracking angle ($\alpha$) are determined in the first control unit (13) from the signals received by the ultrasonic units (F1, F2), and traveling and steering signals are generated such that the vehicle tracks the pacemaker at a predetermined distance.

15 Claims, 3 Drawing Sheets

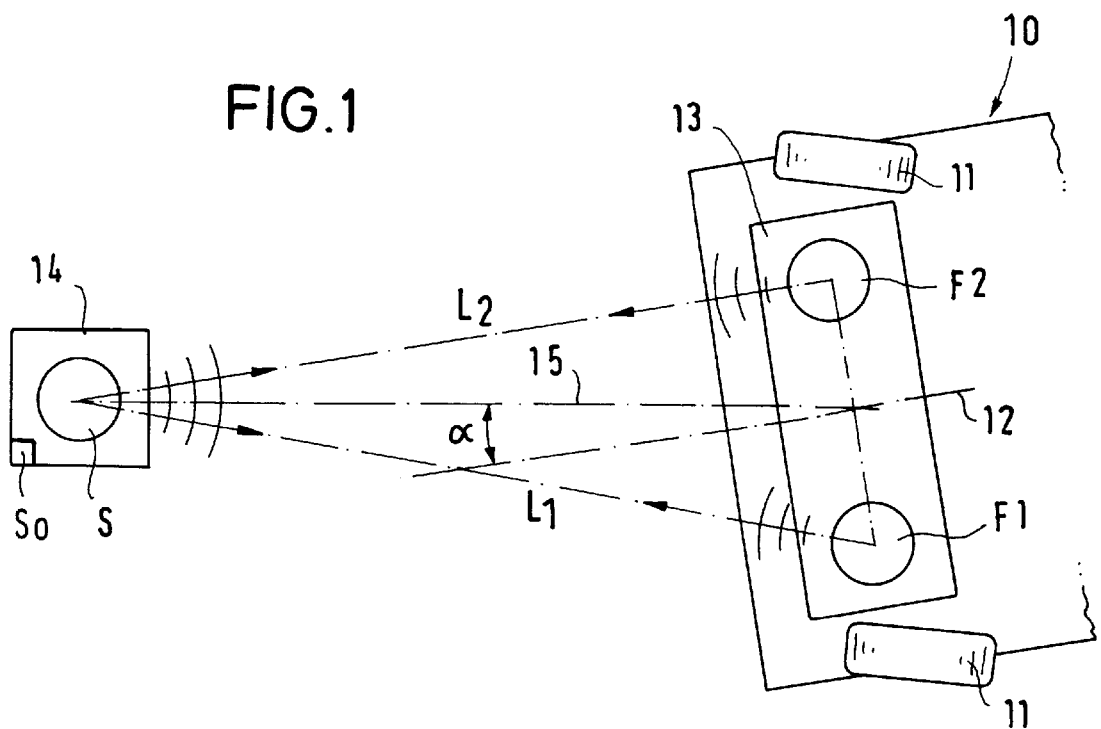
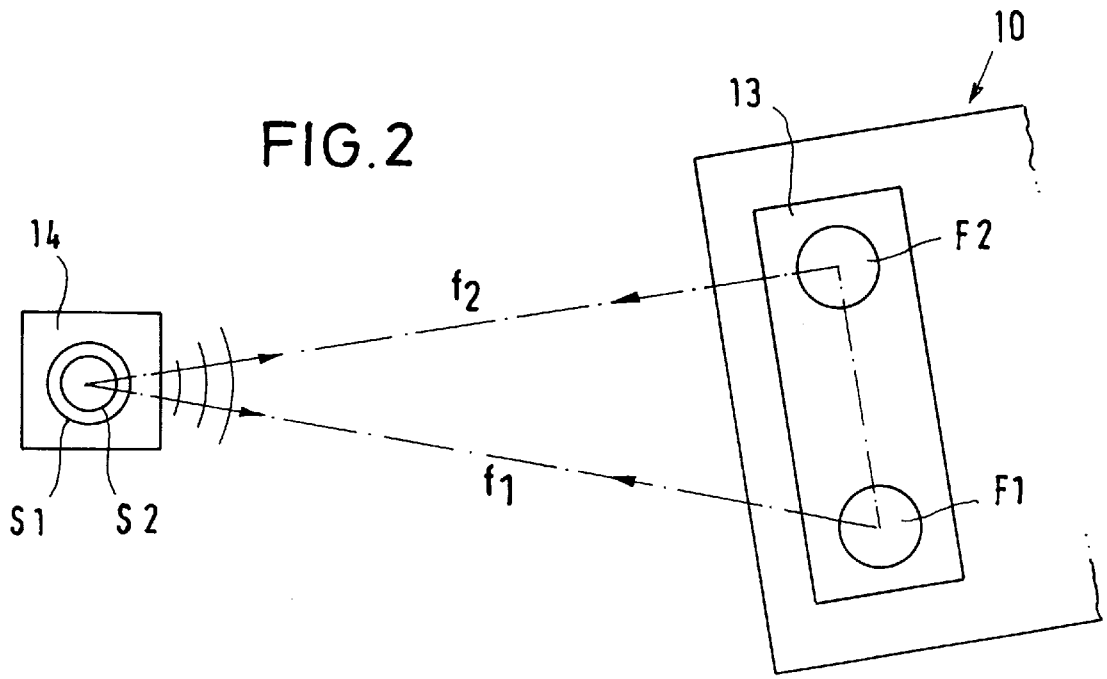

ULTRASONIC TRACKING CONTROL FOR AN AUTOMOTIVE VEHICLE

BACKGROUND OF THE INVENTION

The invention relates to an ultrasonic tracking control for an automotive vehicle which lets the vehicle travel behind, beside or before a person or another pacemaker.

Golf caddies in which the clubs and the equipment of a golfer are transported as well as consigning vehicles for transporting goods in shelf-provided warehouses are known. Such vehicles are controlled by direct manual steering actions of an accompanying person. Thereby, the attention and hands of said person are occupied. The person cannot turn to its real task, that is, the golf game or the reading of a consignment list or the taking out and putting in of articles until the vehicle comes to a standstill. The physical stress of the person because of the steering of the vehicle is another disadvantage.

In order to avoid these disadvantages, it is known to control vehicles with a remote control which is actuated by an accompanying person. The operation of such remote controls requires considerable practice and skill as well as high attention, whereby the circle of users is extremely restricted.

From German Patent DE 43 26 016 C1, an automotive vehicle following a pacemaker is known. To this end, a high-frequency direction-finding means is provided which is effective when the distance between the vehicle and the transmitter exceeds a predetermined distance and whose object is to detect the direction in which, seen from the vehicle, the pacemaker is disposed. Further, an ultrasonic direction-finding means is provided which detects the direction of the pacemaker as well as the respective distance between the vehicle and the pacemaker. This ultrasonic direction-finding means performs merely an intensity measurement. The pacemaker is provided with a transmitter for ultrasonic signals while the vehicle includes an ultrasonic receiving system with two receiving ultrasonic units. Generally, the sound pressure characteristics of an ultrasonic transmitter do not extend exactly radially to the transmitter but may have an irregular form. Thereby, wrong direction determinations are performed in the receiving system. Further, the accuracy of the intensity measurement decreases considerably with increasing distance. These circumstances result in that the vehicle does not always follow the pacemaker on the straightest and shortest way.

Furthermore, tracking controls operating at high-frequency signals are known. Generally, such tracking controls also base on intensity measurements of the received radiation, the amplitude signals received by two receiving units on the vehicle being added for the distance measurement and being subtracted from each other for the direction measurement. Also such tracking systems have relatively great inaccuracies and their realization is extremely troublesome.

SUMMARY OF THE INVENTION

It is the object of the present invention to provide an ultrasonic tracking control which is capable of tracking a pacemaker by means of an automotive vehicle with high precision and certainty.

In the case of the ultrasonic tracking control according to the invention, a first control unit comprising at least two ultrasonic units having a transceiver device each is attached to the vehicle. A mobile second control unit independent of the vehicle and exchanging signals with the first control unit can be carried along by a person or another pacemaker. The tracking control effects that the vehicle automatically follows the pacemaker, traveling either behind or laterally offset beside it. By means of transmission time measurements, the ultrasonic units attached on the vehicle with a lateral offset perform very accurate distance measurements with respect to the pacemaker, so that the distance of the pacemaker from the vehicle and the direction of the pacemaker with respect to the vehicle can be determined. As a function of distance and direction of the pacemaker, the vehicle is driven and steered such that it assumes a predetermined distance and a predetermined direction with respect to the pacemaker. Thereby, it is achieved that the vehicle travels behind, beside or also before the pacemaker at a predetermined distance. The pacemaker may either be a person moving by walking, or even another vehicle. The mobile control unit is constructed such that it can easily be carried on the body of a person, e.g., on a belt or holder.

The wireless communication between the two control units is exclusively effected via ultrasonic signals propagating non-directionally, the time interval between the emission of a signal from the vehicle and the reception of the response signal at the vehicle being determined. Due to the two receiving ultrasonic units of the first control unit, two transit times (one for each of the ultrasonic units) are obtained. Both transmission times give information about the distance between the first and second control units and their difference is evaluated to determine the tracking angle. The tracking angle is the angle between a reference axis of the vehicle and a line interconnecting the two control units.

Generally, the second control unit can be equipped with a single transponder corresponding with each of the ultrasonic units of the first control unit. In this case, however, the ultrasonic units of the first control unit have to be operated in succession, wherein the time intervals therebetween are to be dimensioned such that the response signals can be unambiguously allocated to one ultrasonic unit, respectively.

A better solution is to provide in the second control unit a transponder of its own for each transmitting unit of the first control unit, so that there are respective pairs of transmitting units and transponders. In this case, each pair can be operated at another frequency. As an alternative, it is possible to operate the ultrasonic units and transponders at different frequencies.

The tracking control according to the present invention is particularly suitable for golf caddies, but also for other vehicles, such as, e.g., consignment vehicles for storekeeping. Normally, it has to be reckoned with the operation of several or even numerous automotive vehicles in spatial proximity to each other. In this case, it must be prevented that the tracking control of the one vehicle influences the tracking control of another vehicle. Such a decoupling of tracking controls by selecting different frequencies from one vehicle to the next is only possible to a limited degree, because only a limited number of carrier frequencies are available and there is the danger that two vehicles whose tracking controls operate at the same carrier frequency accidentally come into the mutual range of the transmission systems. To exclude mutual influences, the pulse signals can be emitted in each tracking control in accordance with a pulse pattern of their own which is stored in both the first and second control units, the time intervals between the pulses forming a characteristic sequence. The second control unit exclusively reacts to the sequence of its allocated vehicle. Even if the second control unit receives signals of other vehicles, it does not react thereto, i.e., it does not respond to such foreign signals not fitting into the predetermined frequency.

According to the invention, the vehicle continuously follows a pacemaker equipped with the second control means due to the effect of the tracking control. If the pacemaker wants to separate from the tracking vehicle, it or he only has to switch off the transponder. Then, the latter does no longer supply any response signals to the vehicle and the vehicle stops due to the response signals failing to appear. This means that it is not necessary to perform any manual operations at the vehicle to bring it to a standstill.

To avoid collisions among the vehicles or to prevent the vehicle from hitting an obstacle, the vehicles may be provided with distance sensors causing the drive to stop when the vehicle comes near another vehicle or an obstacle.

BRIEF DESCRIPTION OF THE DRAWINGS

The following is a detailed description of embodiments of the invention taken in conjunction with the accompanying drawings.

The Figures show:

FIG. 1 a schematic plan view of a first embodiment of the control,

FIG. 2 a schematic plan view of a second embodiment of the control,

DESCRIPTION OF THE PREFERRED EMBODIMENTS

Figure 3:
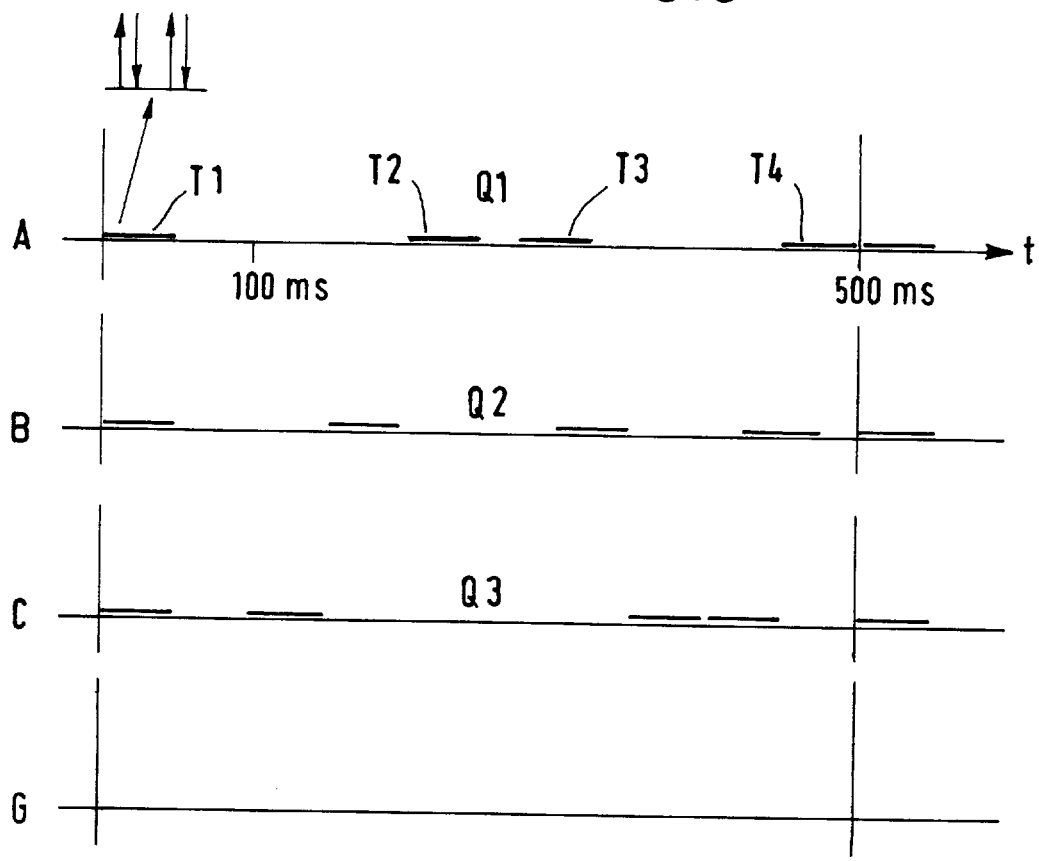
FIG. 3 a time chart of the characteristic sequences of several tracking controls, FIG. 4 an illustration of three golf players who are each tracked by a vehicle with different setting of the tracking parameters, and FIG. 5 a schematic plan view of the undercarriage of a golf caddie.

According to FIG. 1, a vehicle 10 with steerable front wheels 11 is provided. The longitudinal axis of the vehicle is designated with 12. In its front part, the vehicle 10 includes the first control unit 13 comprising two ultrasonic units F1 and F2. These ultrasonic units are arranged symmetrically to the longitudinal axis 12 and have a mutual distance of at least about 50 mm. Each of the ultrasonic units F1,F2 includes a transceiver device for ultrasonic waves. Each of the ultrasonic units F1,F2 emits an ultrasonic pulse at a certain time.

The ultrasonic pulses are received by the second control unit 14 including a transponder S as transceiver means. If the transponder S receives an ultrasonic signal, it supplies, immediately or after a delay time, an ultrasonic signal which is emitted. Said ultrasonic signal is received by both ultrasonic units F1,F2. From the transmission time from the emission of the pulse by the ultrasonic unit F1 to the reception of the response pulse by the ultrasonic unit F1, the length L1 of the distance between F1 and S can be calculated. In the same manner, the length L2 of the distance between F2 and S can be detected from the time period between the emission of a pulse by the ultrasonic unit F2 and the reception of the response pulse by the same ultrasonic unit. From the difference of the two lengths L1,L2 or the respective transit times, the tracking angle α formed by the vehicle axis 12 with the straight line 15 passing through both control units 13,14 is calculated.

It is to be assumed that the vehicle is to directly follow the pacemaker carrying the second control unit 14. In this case, the control unit 13 sets the steerable wheels 11 such that the vehicle axis 12 coincides with the line 15 when the vehicle moves on.

In the embodiment of FIG. 1, the two ultrasonic units F1,F2 and the transponder S all operate at the same carrier frequency of the ultrasonic pulses. To be able to differentiate between the ultrasonic units F1 and F2, the pulses emitted by these ultrasonic units are generated in succession at such intervals that after each pulse emitted by the ultrasonic unit F1, sufficient time for receiving the response pulse emitted by the transponder S is available before the ultrasonic unit F2 emits a pulse.

In the embodiment of FIG. 2, the frequencies f1 and f2 of the two ultrasonic units F1 and F2 are different. The second control unit 14 includes two transponders S1,S2, of which the transponder S1 cooperates with the ultrasonic unit F1 and the transponder S2 cooperates with the ultrasonic unit F2. Here, the ultrasonic units F1,F2 can simultaneously emit the frequencies f1,f2. In spite of the frequency-selective operation, it is also possible to emit the pulses with a time-offset which effects conventional cross-talk-proof characteristics.

The transponders S1 and S2 always generate the response pulse only with a certain delay after the reception of a pulse so that the respective ultrasonic unit F1 or F2 can be switched to reception after emitting a pulse. This time delay between receiving a pulse and emitting the response pulse has a specified constant duration considered in the transit time calculation.

Through a different dimensioning of the delay times in the tracking controls of different vehicles or through different dimensionings of the time intervals at which the pulses of the two ultrasonic units are emitted, a vehicle selection can be performed, each vehicle evaluating only those received pulses which occur in a time window allocated to this vehicle and its transponder. Thus, it can be prevented that the signals of the one tracking system interfere with another tracking system. Another possibility of selection is to repeat each of the pulses emitted by an ultrasonic unit or a transponder after a certain time, which is characteristic for the individual tracking control, and to evaluate only those pulses whose repeat pulse appears within the specified time.

FIG. 3 shows a preferred embodiment of the pulse emission by the ultrasonic units of several vehicles A, B, and C. Within a period duration of 500 ms, for example, different active times T1,T2,T3 and T4 having a duration of about 50 ms each are allocated to the ultrasonic units of the vehicle A. In each active time, the two ultrasonic units F1,F2 of the vehicle emit pulses responded to by the associated transponders S1,S2. The active times T1–T4 have non-uniform time intervals and form a sequence Q1 characteristic for the vehicle and occupying the period duration. After this sequence Q1 has come to an end, the same sequence is repeated. The sequence Q1 of the active times T1–T4 is permanently stored in the vehicle A as well as in the associated second control unit 14. The transponder reacts only to those signals received in the specified active times T1–T4. Signals appearing in the intervals between the active times are left unanswered.

In the same way, the active times of the vehicle B form a characteristic sequence Q2 different from the sequence Q1. The active times of a third vehicle C form a characteristic sequence Q3. Different from the sequences Q1 and Q2. The evaluation of the signals in the vehicle is not performed until the ultrasonic units F1,F2 have received responses of the transponders S1,S2 in all active times T1–T4 of a sequence. If a response fail to appear, such as shown by a fourth vehicle G of FIG. 3 the vehicle is stopped.

FIG. 3 shows the case that the sequences Q1,Q2,Q3. all start at the same time. Suitably, however, the start times of the sequences are offset from each other. Besides, there is the possibility that the ultrasonic unit emits an initializing signal at the beginning of each sequence which informs the transponder about the beginning of the sequence.

On the basis of a signal exchange with the transponder, the first control unit 13 evaluates new values of amount and direction only if they do not exceed a predetermined difference between the last valid values. Thereby, it is ensured that "runaways" caused by disturbances do not result in a change in the vehicle control.

Figure 4:
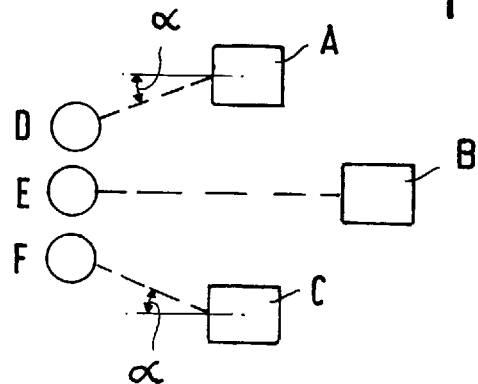

In the second control unit 14, the tracking angle α (FIG. 1) assumed by the second control unit with respect to the vehicle longitudinal axis 12 at the predetermined distance can be adjusted such that the vehicle 10 tracks the control unit 14 with a lateral offset. FIG. 4 shows three golf players D,E,F each tracked by a vehicle A,B,C. The tracking angles α and the nominal distances are set differently so that the vehicles do not collide even if the golf players walk close beside each other. In this case, the vehicles A and C track their respective pacemakers D and F with lateral offset.

Figure 5:
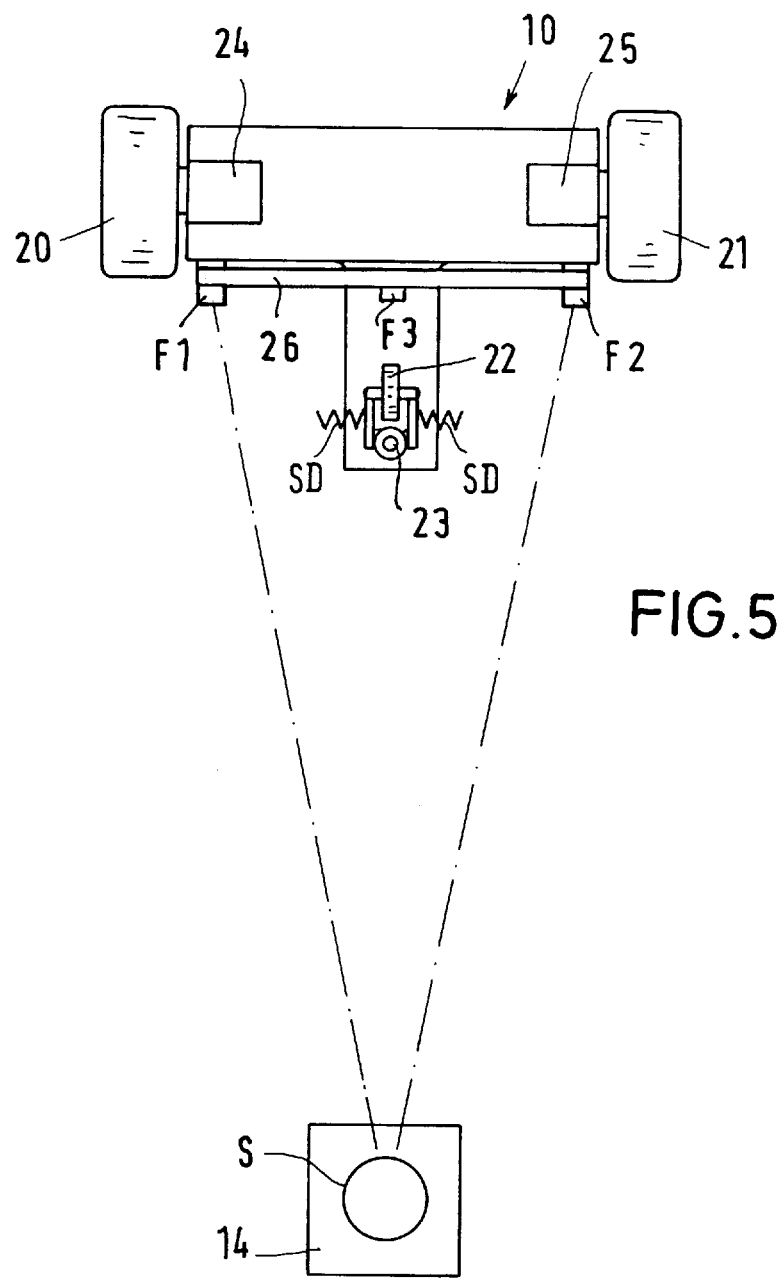

FIG. 5 shows a vehicle 10 in the form of a golf caddie with two driven wheels 20,21 and a self-adjusting third castor wheel 22 pivotable about a vertical axis 23. The castor wheel 22 is centered to straight travel by a spring device SD. When the steering moment exerted from the bottom onto the castor wheel 22 exceeds a certain limit, the force of the spring device is overcome. Therefore, a deviation of the castor wheel from the direction suitable for straight travel is only possible against a resetting spring force. The wheels 20,21 are adapted to be driven separately by motors 24,25. In case of straight travel, the motors 24,25 run at the same speed. For curvilinear travel, they are driven at different speeds, the difference speed determining the radius of the curve traveled.

In this embodiment, the ultrasonic units F1,F2 are receiving units which are only able to receive. The ultrasonic unit F3 serves as transmitting unit. All three ultrasonic units F1,F2,F3 are attached to a common housing 26 constructed as a transverse bar with respect to the vehicle 10. The housing 26 contains the electronic components of the first control unit 13. Hence, the entire evaluation unit is mounted in and on the housing 26 as an independent constructional unit. The transmitting ultrasonic unit F3 and the receiving ultrasonic units F1,F2 cooperate with the mobile control unit 14 carried on the body of the golf player who goes ahead.

The first control unit and/or the second control unit assume a waiting state with reduced energy consumption when it does not receive any signals from the other control unit within a predetermined time period. Energy consumption is reduced thereby.

The control unit 14 of the pacemaker is fed by a rechargeable battery which can be put into a plug-in box on the vehicle upon standstill, where it is charged by the vehicle battery.

In a further embodiment of the invention (not shown), the first control unit contains an ultrasonic unit operating as a transmitter at a first frequency $f_1$, and two further ultrasonic units operating as receivers at a second frequency $f_2$ different from $f_1$. The mobile second control unit contains an ultrasonic unit operating as a receiver at the first frequency $f_1$, and a further ultrasonic unit operating as a transmitter at the frequency $f_2$. Preferably, the frequencies $f_1$ and $f_2$ are between 20 and 50 kHz, particularly at 25 kHz and 40 kHz.

The frequency may be adjustable at the ultrasonic units of the first and second control units (e.g., to 23 kHz, 25 kHz or 27 kHz, respectively), whereby golf players accidentally meeting in a flight can adapt the tracking controls of their vehicles to each other to avoid mutual disturbances.

Finally, an additional, independently acting emergency stop means so may be integrated into the first control unit. The emergency stop means measures the transit time of ultrasonic pulses from the first control unit to a possible obstacle and of the sound pulses the obstacle reflects back to the first control unit. If this transit time falls short of a predetermined minimum transit time, the emergency stop means stops the vehicle.

What is claimed is:

1. An ultrasonic tracking control for a vehicle, comprising:

a first control unit (13) supplying traveling and steering signals for the traveling operation of a vehicle (10) and being arranged on the vehicle (10), and several ultrasonic units (F1, F2; F3) of which at least two are capable of reception at different times and at least one is configured for transmission, and a mobile second control unit (14) independent of the vehicle (10) and comprising at least one transponder (S, S1, S2) responding to the ultrasonic signals of at least one of the transmitting ultrasonic units (F1, F2; F3), the first control unit (13) detects the amount and direction of the distance of the vehicle (10) from the second control unit (14) by measuring the time between the emission of a signal and the reception of the response signal, and generates the traveling and steering signals such that the vehicle (10) tracks the second control unit (14) at a predetermined distance.

2. The tracking control according to claim 1, wherein the second control unit (14) includes a second transponder (S1,S2) of its own for each ultrasonic unit (F1,F2) of the first control unit (13), the pairs of ultrasonic unit and transponder being operated selectively and cross-talk-proof.

3. The tracking control according to claim 1, wherein in the first control unit one of said ultrasonic units ($F_1$) operates as a transmitter at a first frequency $f_1$ and two other ultrasonic units operate as receivers at a second frequency $f_2$ different from $f_1$, and wherein in the second control unit (14) an ultrasonic unit operates as a receiver at the frequency $f_1$, and a second ultrasonic unit operates as a transmitter at the frequency $f_2$.

4. The tracking control according to claim 3, wherein the frequencies $f_1$ and $f_2$ are each between 20 and 50 kHz.

5. The tracking control according to claim 1, wherein said ultrasonic units generate a frequency which is adjustable by the first and second control units.

6. The tracking control according to claim 1, wherein ultrasonic units (F1,F2) are controlled such that (they emit signals at non-uniform time intervals in respective active times (T1–T4), a group of active times (T1–T4) separated by non-uniform time intervals forming a repeating sequence (Q1) characteristic for the vehicle (10), and wherein the characteristic sequence (Q1) of another vehicle (A) is stored in the second control unit (14) which only responds to such signals of the first control unit (13) coinciding with the active times (T1–T4) of the sequence (Q1).

7. The tracking control according to claim 1, wherein the first control unit (13) stops the vehicle (10) if it does not receive any response signal of the transponder (S) in response to an emitted signal for a predetermined number of times within a predetermined time period.

8. The tracking control according to claim 1, wherein the second control unit (14) includes a switch so for switching off the transponder (S).

9. The tracking control according to claim 1, wherein the first control unit (13) and/or the second control unit (14)

assume a waiting state with reduced energy consumption if it does not receive any signals of the other control unit over a predetermined period of time.

10. The tracking control according to claim 1, wherein the first control unit (13) evaluates new values of amount and direction of the distance of the second control unit (14) on the basis of a signal exchange with the transponder (S) only if the new values do not exceed a predetermined difference to the last valid values.

11. The tracking control according to claim 1, wherein a tracking angle (α) of the second control unit (14) with respect to a longitudinal axis (12) of the vehicle at the predetermined distance is adjustable such that the vehicle (10) tracks the second control unit (14) with lateral offset.

12. The tracking control according to claim 1, wherein the vehicle (10) is a golf caddie with two wheels (20,21) driven by separate motors (24,25) and a self-adjusting castor wheel (22), the first control unit driving the speeds of the two motors (24,25) for steering.

13. The tracking control according to claim 12, wherein a spring device is provided which permits the castor wheel (22) to deviate from the direction suitable for straight travel only if a limit moment is exceeded.

14. The tracking control according to claim 1, wherein the first control unit (13) generating the steering signals is accommodated in a housing (26) which also carries the ultrasonic units (F1,F2,F3) and is configured as an elongated strip.

15. The tracking control according to claim 1, wherein an additional, independently acting emergency stop means is integrated in the first control unit (13), which measures the time of transmission of ultrasonic pulses from said first control unit to possible obstacles and sound pulses reflected therefrom back to the first control unit and stops the vehicle upon reception of ultrasonic pulses within a minimum transmission time.

* * * * *

UNITED STATES PATENT AND TRADEMARK OFFICE
CERTIFICATE OF CORRECTION

PATENT NO. : 5 810 105
DATED : September 22, 1998
INVENTOR(S) : Wolfram Trainer

It is certified that error appears in the above-indentified patent and that said Letters Patent is hereby corrected as shown below:

On the title page: Item [73]

The assignee's address should read as follows:

-- Mauren, Liechtenstein --.

Signed and Sealed this

Twenty-seventh Day of April, 1999

*Attest:*

Q. TODD DICKINSON

*Attesting Officer*  *Acting Commissioner of Patents and Trademarks*